United States Patent [19]

Suga

[11] Patent Number: 5,712,524
[45] Date of Patent: Jan. 27, 1998

[54] PIEZOELECTRIC ROTATION DRIVING APPARATUS

[75] Inventor: Michihisa Suga, Tokyo, Japan

[73] Assignee: NEC Corporation, Japan

[21] Appl. No.: 578,320

[22] Filed: Dec. 26, 1995

[30] Foreign Application Priority Data

Dec. 27, 1994 [JP] Japan .................... 6-326223

[51] Int. Cl.[6] ..................................... H02N 2/00
[52] U.S. Cl. ............................. 310/328; 310/323
[58] Field of Search ........................... 310/328, 323

[56] References Cited

U.S. PATENT DOCUMENTS

| | | | |
|---|---|---|---|
| 4,613,782 | 9/1986 | Mori | 310/323 |
| 4,714,855 | 12/1987 | Fujimoto | 310/328 |
| 4,769,569 | 9/1988 | Stahlhuth | 310/328 |
| 4,783,610 | 11/1988 | Asano | 310/328 |
| 5,034,647 | 7/1991 | Ohtsuka | 310/328 |
| 5,051,594 | 9/1991 | Tsuda et al. | 250/442.1 |
| 5,132,582 | 7/1992 | Hayashi | 310/323 |
| 5,282,404 | 2/1994 | Leighton et al. | 83/13 |
| 5,465,021 | 11/1995 | Visscher et al. | 310/328 |

FOREIGN PATENT DOCUMENTS

| | | |
|---|---|---|
| 61-224886 | 10/1986 | Japan . |
| 61-258679 | 11/1986 | Japan . |
| 6412878 | 1/1989 | Japan . |
| 267772 | 3/1990 | Japan . |
| 3273871 | 12/1991 | Japan . |

*Primary Examiner*—Thomas M. Dougherty
*Attorney, Agent, or Firm*—Hayes, Soloway, Hennessey, Grossman & Hage, P.C.

[57] ABSTRACT

The present invention provides a piezoelectric rotation driving apparatus wherein the number of the piezoelectric driving bodies is reduced so as to reduce the size of the apparatus. The apparatus is capable of achieving high efficiency and high torque by extinguishing an inertia rotation period. In are preferred embodiment of the invention, a set of the piezoelectric driving bodies including stacked piezoelectric elements are pressed against a cylindrical rotation body serving as a rotor, which is fitted to a rotation shaft, with leaf springs. The piezoelectric driving bodies are combined integrally with each other by a fitting pin such that action directions of forces of action members in the piezoelectric driving bodies driven by the stacked piezoelectric elements are opposite to each other.

5 Claims, 13 Drawing Sheets

PIEZOELECTRIC ROTATION DRIVING APPARATUS

BACKGROUND OF THE INVENTION

1. Field of the Invention

The present invention relates to rotation driving apparatus which uses a deformation force as a driving source, produced when applying a voltage to a piezoelectric element, more particularly to a rotation driving apparatus which is suitable for wide application to use in precision instruments and the like, which has a small size and ability to perform continuous rotation and small angle control with high torque.

2. Description of the Related Art

There have been many proposed rotation apparatus using piezoelectric elements, and some of these proposed rotation apparatuses have been put to practical use. So called ultrasonic motors which are capable of rotation operation utilizing ultrasonic vibration energy produced by the piezoelectric elements are mentioned as typical ones.

An operation principle of the ultrasonic motor is described as follows. When the ultrasonic vibration is produced by the stator using the piezoelectric element and further an elliptical vibration is produced at the surface of the stator contacting the rotor, a frictional force in one direction acts always on the rotor, as long as the stator contacts the rotor during the elliptical vibration, so that the rotor rotates in the acting direction of the frictional force.

A travelling wave system and a standing wave system have been known as a way for forming the elliptical vibration in the stator. The former employs a circular ring-shaped vibration plate as a stator having a reverse side attached with a piezoelectric element, wherein the surface of the stator performs the elliptical vibration when energizing the travelling wave which travels around the stator, and the rotor pressed firmly against the stator rotates toward the opposite direction of that of the travelling wave. The former has been put to practical use as a camera lens drive. On the other hand, the latter forms the elliptical vibration on the surface of the stator by synthesizing vibration modes in longitudinal and transverse directions such as a longitudinal vibration and a torsional vibration, thereby rotating the rotor which is pressed firmly against the stator.

These ultrasonic motors have been expected to realize a smaller size, a higher efficiency, and a higher torque compared to conventional electromagnetic motors. Nevertheless, ultrasonic motors have not realized as much increase in performance as has been expected. The reason is that since vibration frequency of the ultrasonic vibration is as high as more than 20 kHz, there exists difficulty in enhancing amplitude of the elliptical vibration so that it is normally less than 1 μm, and in addition, the time when the stator in contact with the rotor is less than ¼ cycle of the elliptical vibration.

For these reasons, to make the frictional force act on the rotor stably, it is necessary to work the contacting surfaces of both of the rotor and the stator with an extremely high accuracy. However, with normally available working technique, variations in the characteristics of the ultrasonic motors are large and operations thereof are unstable. Furthermore, since power loss due to the generation of frictional heat is large, it has been difficult to realize high torque. Since it is required to increase the working accuracy much more at the time of planning to miniaturize the motor, realizing the miniaturization has been difficult. Considering such situations, some proposals concerning the rotation apparatuses seeking to realize the miniaturization and high torque by employing a stacked type piezoelectric element have been made. As an example, a piezoelectric actuator is disclosed in FIGS. 1 and 2 (not shown) of Published Unexamined Japanese Patent Application Shouwa 64-12875. In this piezoelectric actuator, a displacement of the stacked type piezoelectric element due to an application of a voltage thereto is produced so that a rotation disk is thrust in a rotation direction. At this time, a rotation shaft is also rotated slightly in the rotation direction through a one way clutch. When the application of the voltage is stopped, the rotation disk is returned to the original position by a restoring device. The returning force produced by the restoring device does not act on the rotation shaft by the effect of the one way clutch. Hence, the rotation shaft rotates bit by bit every time the above operations are repeated.

However severe problems that obstruct high efficiency and high torque of such kind of ultrasonic motors are involved in the foregoing conventional ultrasonic motors. Specifically, in the case where a load is imposed to restore the rotation disk into the original position, in other words, when a string is wound around the rotation shaft and a weight is attached on the end of the string, it is necessary to restore the rotation disk to the original position quickly at the time of restoring the rotation shaft thereto and to perform a subsequent application of the voltage. If this is not done, the rotation shaft is restored together with the rotation disk and the rotation in one way direction by the rotation shaft becomes difficult. Particularly, when the load is large, the rotation shaft is restored fast so that the rotation of the rotation shaft is impossible. Specifically, the use of the rotation shaft is difficult when the load in the opposite direction is imposed on the rotation shaft.

A piezoelectric driving apparatus which performs another rotation motion is disclosed in FIG. 1 (not shown) of Published Unexamined Japanese Patent Application Heisei 2-67772. In this piezoelectric driving apparatus, one end terminals of first and second wires are fitted to a driving pulley, and the other terminals thereof are fitted via an elastic body and a driving piezoelectric element, respectively. With such a construction, the driving piezoelectric element is vibrated thereby making the driving pulley perform a reciprocating rotational vibration. On the other hand, a rotation body is provided coaxially with the driving pulley so as to be contacted with the driving pulley via a piezoelectric element for a clutch and a clutch plate. In the state where the driving pulley is moving rotatively in one direction, the rotation plate performs the rotation operation in the forward direction in the following cases. For example, at the time of the forward movement, a voltage is applied to the piezoelectric element for the clutch such that the clutch plate contacts with the driving pulley, and at the time of the backward movement, the application of the voltage is stopped such that the clutch plate separates from the driving pulley, whereby the rotation plate rotates in the forward direction.

However, also in this example, during the period when the clutch plate separates from the driving pulley, the rotation shaft is free, and it continues to move merely by inertia. When a load in an opposite direction to the rotation direction is imposed on the rotation plate, the rotational movement of the rotation plate is made difficult. If the load is large, the rotation plate begins to rotate in the opposite direction.

In FIGS. 1 to 8 (not shown) of Published Unexamined Patent Application Shouwa 61-224886, another conventional piezoelectric rotation apparatus is disclosed. In this apparatus, first of all, a voltage is applied to a first piezoelectric driving element, and a clamping force due to an offset pressure in addition to a variable pressure is imposed on the element to connect a connecting component to the outer surface of a rotation shaft. At the same time, the rotation shaft is clamped. Next, second and third piezoelectric driving elements of an incremental driving means are operated to move in parallel clamped points, whereby a rotation force in a predetermined direction is applied to the rotational shaft. Thereafter, a voltage is applied to the first piezoelectric element, which acts decrementally on the clamping force due to the offset pressure, whereby the aforementioned connecting component is made freely slidable along the outer surface of the rotation shaft. At the same time, the aforementioned second and third piezoelectric driving elements are allowed to operate to make the aforementioned connecting component slide. Finally, the clamping points are in parallel moved to the initial state to complete one cycle. By repeating this cycle, the rotation shaft can be rotated.

However, also in this conventional apparatus, likewise in the foregoing other conventional apparatus, since the period when the connecting component is allowed to freely slide along the outer surface of the rotation shaft is present, when a load is imposed in an opposite direction to the rotation direction, the load affects the rotation direction of the rotation shaft such that the normal movement thereof is obstructed. Hence, an decrease in an efficiency and an torque, and an instability and the like will be brought about.

In the foregoing conventional apparatus, during the time when first the rotation shaft and the rotor receive the force to rotate in a predetermined direction and again receive the force, there has been the period when no external force acts on the rotation shaft and the rotor while the rotation shaft the rotor merely continue to rotate by inertia. Therefore, when the load is imposed in a direction to obstruct the rotation during this period of the inertia rotation, rotation efficiency and stability are reduced. In worst cases, there exist the common problem that continuing rotation may be difficult.

To cope with such problems of the presence of the rotation period by the inertia, a rotation body is proposed in FIGS. 1 and 2 (not shown) of Published Unexamined Patent Application Shouwa 61-258679. In this rotation body, two clamping elements composed of one stacked type piezoelectric element and a pair of arms are employed. While clamping a disk by two clamping elements alternatively, the arms are moved to rotate the disk.

However, in such rotation apparatus employing the aforementioned rotation body, three stacked type piezoelectric elements are needed; two of three elements are for clamping, and one of three elements is for arm driving. A driving circuit is necessary for respective stacked type piezoelectric elements. A rotation driving mechanism, which is composed of two clamping mechanisms and one arm driving mechanism, is complicated, and is hard to be adjusted. Hence, the apparatus is expensive and is hard to be operated stably so that it is difficult to obtain a high torque with stability.

As another conventional rotational apparatus which excludes a rotation period by the inertia using a stacked type piezoelectric element, there has been proposed a piezoelectric motor using two stacked type piezoelectric elements, which is disclosed in FIG. 1 (not shown) of Published Unexamined Patent Application Heisei 3-273871. This motor employs two displacement magnification mechanism which are designed such that a small displacement of the stacked type piezoelectric element is converted to bending a beam thereby obtaining a large displacement. In this motor, a vibration plate connected to the beam at the maximum displacement point thereof by a hinge performs a rotational vibration in a horizontal direction. If a rotational shaft contacting the inner surface of the circular hole is formed, the hole being formed at the center of the driving plate, the motor can rotate in a desired direction.

In case of this motor, it is possible to extinguish the inertia rotation period by connecting normally the inner surface of the circular hole and rotation shaft to each other. Furthermore, in order to obtain a stable rotation, it is necessary to make the vibration amplitude of the vibration plate large. Hence, a buckling lever type displacement magnification mechanism is employed, which utilizes the bending of a beam producing a large displacement magnification ratio. However, when the beam having the large displacement magnification ratio is used, the force which can be taken out from the stacked type piezoelectric element is small. Furthermore, in case buckling lever type displacement magnification mechanism, loss of force due to unnecessary deformation of the beam is caused. It is difficult to achieve a high motor torque by means of the technology of the conventional piezoelectric motor. Furthermore, from the viewpoint of the structure of the apparatus, although the thickness of the apparatus can be lessened, there is a limitation to reducing the horizontal dimension, for the sake of making the vibration amplitude of the vibration plate large. Hence, it has been difficult to miniaturize the size of the apparatus.

There are first and second factors as the reasons why the conventional so called ultrasonic motor can not realize miniaturization, high efficiency, and high torque sufficiently, which converts an ultrasonic rotation elliptical vibration energy to rotation energy. The first factor is that the elliptical vibration at ultrasonic frequency is not so large. The second factor is that the period when the stator contacts with the rotor to impose the friction force on the rotor is as short as less than ¼ cycle of the elliptical vibration.

In general, to make the vibration amplitude larger becomes much easier, as the vibration frequency is reduced. For the following reason, as the vibration frequency is reduced, the stator comes to contact normally with the rotor. The rotational operation is stopped.

Specifically, in the ultrasonic motor, to make the ultrasonic motor perform the rotational operation, the rotor and the stator must be connected to each other in the period of the upper half of the elliptical vibration, and the rotor and the stator must be separated from each other in the period of the lower half thereof. In the upper half of the elliptical vibration, the stator applies the friction force to the rotor while thrusting up the rotor. In the lower half of the elliptical vibration, during the period when the rotor maintains the state of having been thrust by the stator, the stator returns to the original position without contacting the rotor.

However, aiming to make the vibration amplitude large, as the vibration frequency is reduced step by step, the force of the stator to thrust up the rotor is weakened, and the period of one cycle is shortened. Therefore, the rotor comes to contact the stator before the stator returns to the original position completely. The situation is brought about that the friction force acts in an opposite direction to the rotation is brought about. Finally, the length of the period that the rotor is being separated from the stator becomes zero so that the rotor comes to perform only the vibration together with the stator. To thrust up the rotor with a sufficient force, the vibration speed of the stator must be sufficiently high. In the case of the ultrasonic vibration, this condition can be satisfied substantially. On the other hand, when the vibration amplitude becomes large, a large driving power is needed so that the practical use of the apparatus is difficult.

The period wherein the stator is allowed to thrust up the rotor is equal to half of the period wherein the stator moves from the bottom to the top, i.e., ½ cycle of the elliptical vibration. Of the ½ cycle, period wherein the friction force can be applied in the rotation direction is equal to the half of the ½ cycle, i.e., ¼ cycle of the elliptical vibration. In an actual ultrasonic motor, the period wherein the friction force is applied to the rotor is no more than ¼ cycle of the elliptical vibration.

To realize miniaturization and high torque, in the conventional rotation apparatus which employs the stacked type piezoelectric element, between the time of the application of the friction force to the rotor or the rotation shaft in the rotation direction and the time of the subsequent application of the friction force thereto, inertia motion period has existed in which the external force is not applied. For this reason, the use under the conditions that a load torque is normally imposed to the rotation shaft is difficult because of lowering of rotation efficiency and stability.

In the conventional rotation apparatus which extinguishes the aforementioned inertia rotation period to produce the stability and the high torque, at least three stacked type piezoelectric elements are needed, and the rotation driving mechanism is complicated such that its adjustment is difficult. Hence, the apparatus is very high in price, and it is difficult to produce the high torque with stability. In another rotation apparatus of this kind, to make the vibration amplitude large, the buckling lever type displacement magnification mechanism is employed. Although the inertia rotation period is extinguished, the force taken out from the stacked type piezoelectric element is small so that it is difficult to obtain the high torque.

SUMMARY OF THE INVENTION

Considering the circumstances of the foregoing conventional apparatus, the object of the present invention is to provide a piezoelectric rotation driving apparatus having a simple construction, which is capable of realizing stability and high toque without producing an inertia rotation period.

Aiming at an advantageous principle of a lever as displacement magnification means losing little force, the present invention plane to achieve stability and high torque using a low cost mechanism by applying the principle of the lever.

The present invention has a feature that a piezoelectric driving body is composed of an action member having an action surface contacting with a rotor; a base member connected to the action member at a fulcrum portion thereof by a first hinge, the fulcrum portion enabling the action member to move rotatively; a piezoelectric element, one end of which is connected to the action member by a second hinge, and the other end of which is connected to the base member by a third hinge, the element expanding by being applied with a voltage and driving the action member thereby allowing the action surface to move rotatively, wherein at least one set of the piezoelectric driving bodies are adapted integrally in the apparatus such that said action surfaces are disposed on the same line and in parallel to the central axis of the rotor and the rotational displacement directions of said action surface are opposite to each other, and the action surfaces of the piezoelectric driving bodies are thrust toward the axis center of the rotor by an elastic force due to an elastic member.

Furthermore, the application of the voltage to the piezoelectric elements of one set of the piezoelectric driving bodies is performed such that the application of the voltage to one piezoelectric element is begun in accordance with the rotation direction of the rotor, and the application of the voltage to the other piezoelectric element is begun at the time when the half time of the application period to one piezoelectric driving body has passed.

Furthermore, plural sets of the piezoelectric driving bodies integrated with each other may be disposed along the center axis of the rotor, or the plural sets of the piezoelectric driving bodies integrated with each other may be disposed around the rotor.

Furthermore, the rotor is composed of a rotation shaft and a flange portion extending from the rotation shaft perpendicular to the rotation shaft, and a plurality of piezoelectric driving bodies are arranged on the side of the flange portion at intervals.

For example, when a pair of the piezoelectric driving elements are used, to rotate the rotor in a positive direction, the piezoelectric driving body where the action direction of the force (action surface) is positive is first selected, and the voltage is applied to the piezoelectric element thereof so as to make it expand. As a result, the action point of the piezoelectric driving body moves. Specifically, the action member rotates around the hinge as a fulcrum, the hinge being connected to the base member, so that the action surface moves its position rotatively. Therefore, the action surface rotates the rotor toward the positive direction a little and thrusts it upward. At this time, in the piezoelectric driving body where action direction of the force is negative, the action surface thereof changes its state, where it is pressed against the rotor into the state where it separates from the rotor.

Subsequently, the voltage is applied to the piezoelectric element of the piezoelectric driving body where the action direction of the force is negative, and its action surface changes its position rotatively. Specifically, moving toward the negative direction, the action surface changes its state, where it is separated from the rotor, to the state where it is pressed against the rotor.

In such states of the action surface after having moved to new positions, both the piezoelectric driving bodies where the action direction of the force is positive and negative remain in a state that they thrust the rotor upward.

Next, stopping the application of the voltage to the piezoelectric driving body where the action direction of the force is positive, the action point returns to the initial position. At this time, since the rotor is in the state that it is supported by the piezoelectric driving body where the action direction of the force is negative, as the action point returns to the initial position, the action point changes gradually from the state, where it is pressed against the rotor to the state, where it separates from the rotor. Although the action point returns toward the negative direction, no force to rotate the cylindrical rotation body toward the negative direction acts. Finally, stopping the application of the voltage to the piezoelectric driving body where the action direction of the force is negative, the action point returns to the initial point. Returning to the initial position, the action point is in the state that it supports the rotor, and the action point returns toward the positive direction. Therefore, the rotor rotates toward the positive direction a little.

Specifically, the rotor rotates twice toward the positive direction bit by bit, first at the time of the application of the voltage to the piezoelectric driving body where the action direction of the force is positive and secondly at the time of stopping the application of the voltage to the piezoelectric driving body where the action direction of the force is negative. By repeating these operations as one cycle, the positive rotation operation can be performed. Similarly, if the piezoelectric driving body where the action direction of the force is negative is first selected to be applied with the voltage, the negative rotation operation can be performed.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE PREFERRED EMBODIMENT

An embodiment of the present invention will be described with reference to FIGS. 1 to 10 in detail, below.

Figure 1:
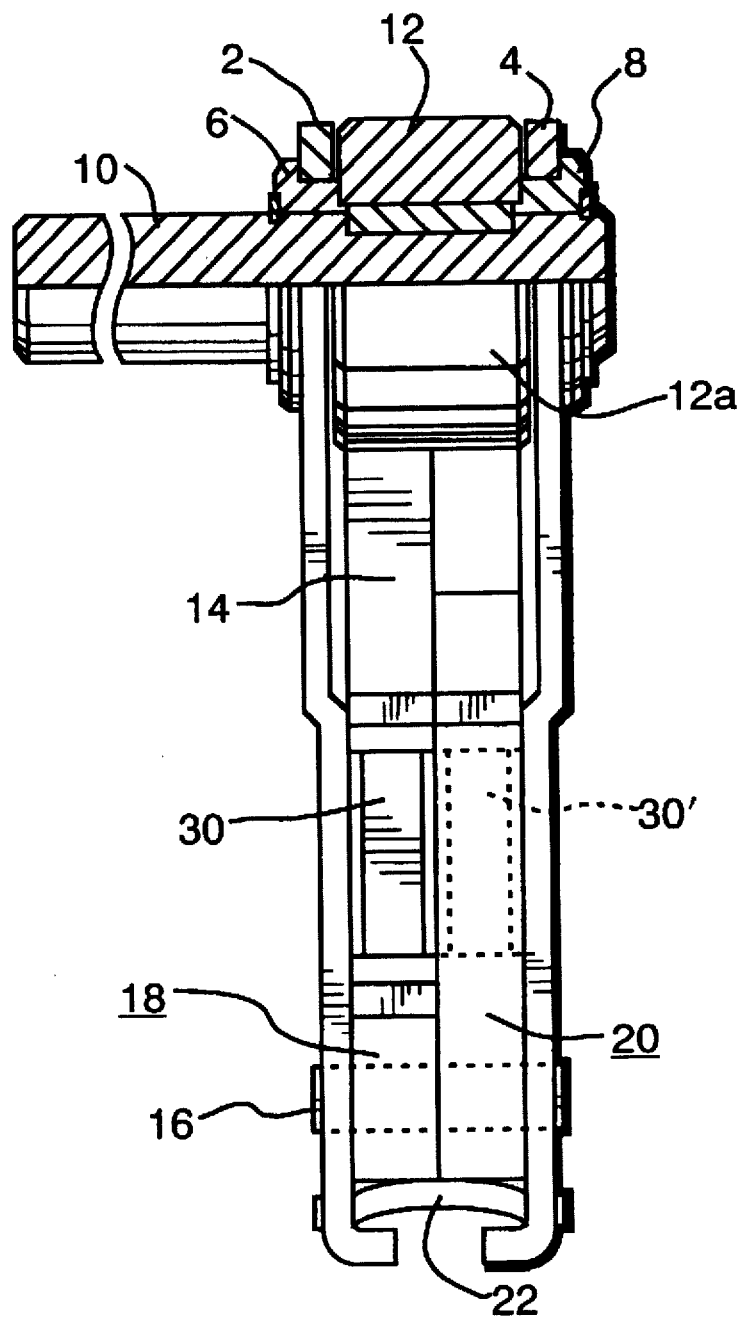
FIG. 1 is a front view showing a partially sectional illustration of a first embodiment of the present invention.
Figure 2:
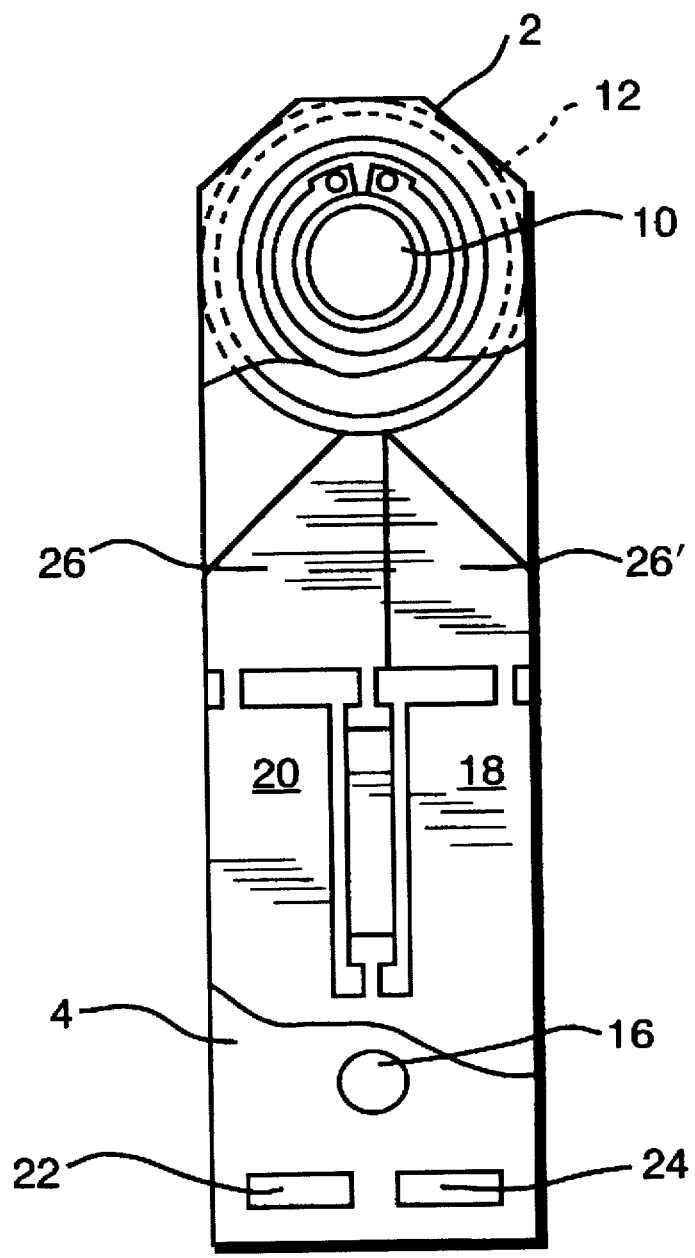
FIG. 2 is a side view of the embodiment of FIG. 1.

Referring to FIG. 1 and FIG. 2 which is a side view of the embodiment of FIG. 1, bearings 6 and 8 are fitted to a pair of side plates, and a rotation shaft 10 is supported rotatitively by the bearings 6 and 8. A cylindrical rotation body 12 serving as a rotor is fastened to the rotation shaft 10. The rotation shaft 10 is designed so as to be driven rotatively by a piezoelectric rotation driving apparatus 14 which contacts with the cylindrical rotation body 12.

The piezoelectric rotation driving apparatus 14 is composed of a set of piezoelectric driving bodies 18 and 20, and leaf springs 22 and 24. The piezoelectric driving bodies 18 and 20 are bundled by a fitting pin 16 so that acting directions of forces produced by bodies 18 and 20 are oriented in opposite directions. The leaf springs 22 and 24 serve as an elastic member for thrusting each of the piezoelectric driving bodies 18 and 20 to the cylindrical rotation body 12.

Figure 3:
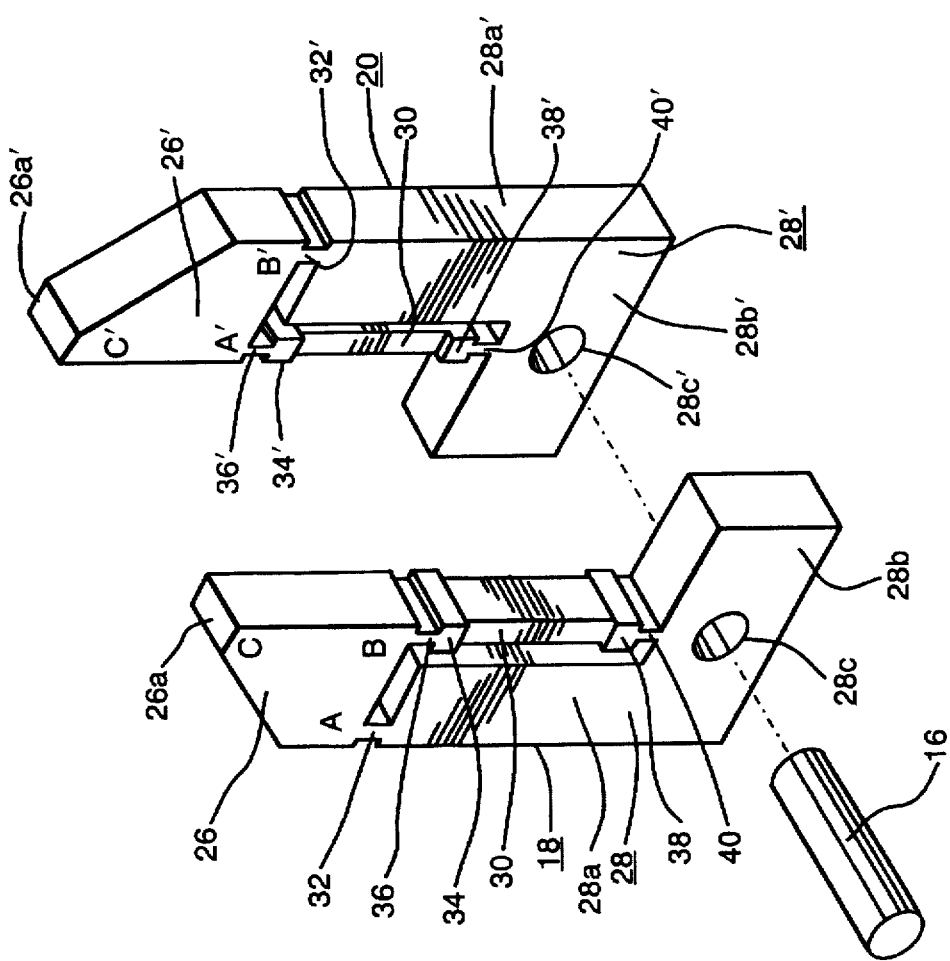
FIG. 3 is an exploded perspective view of a set of piezoelectric driving bodies in the first embodiment.
Figure 4:
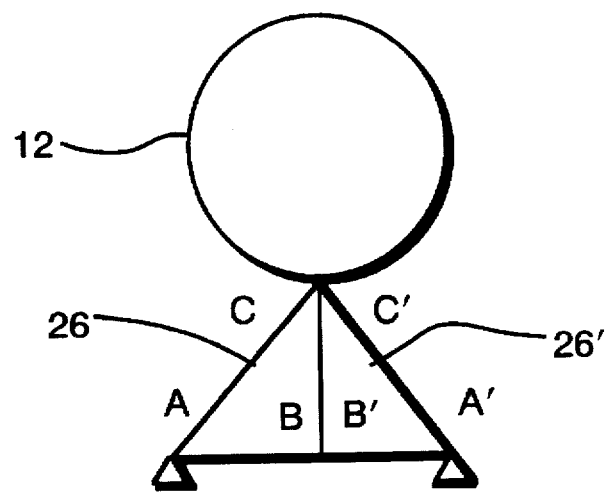
FIG. 4 is a diagram showing an operation principle in a state that the piezoelectric driving body is energized.

Referring to FIG. 3, the respective piezoelectric driving bodies 18 and 20 are composed of action members 26 and 26' contacting with the outer surface of the cylindrical rotation body 12, base members 28 and 28' of approximately L character-shaped supporting the action members 26 and 26' rotatitively, and stacked type piezoelectric elements 30 and 30' driving the action members 26 and 26'. The side surfaces of the action members 26 and 26' are formed so as to be approximately a triangular shape, and action surfaces 26a and 26a' which contact directly with the outer surface. 12a of the cylindrical rotation body 12 are formed at one apex of the triangles (action points C and C'), the action surfaces 26a and 26a' being formed so as to be a rectangular plane surface. Furthermore, another one apexes (fulcrums A and A') of the action members 26 and 26' are connected to the top ends of the vertical blade members 28a and 28a' of the base members 28 and 28' by hinges 32 and 32' so that the action surfaces 26a and 26a' are allowed to move rotatively.

The stacked type piezoelectric elements 30 and 30' are disposed along the vertical blade portions 28a and 28a' of the base members 28 and 28'. The top portions of the element 30 and 30' are connected to the residual apexes (force points B and B') by hinges 36 and 36' interposing seat members 34 and 34' between the hinges 36 and 36' and the element 30 and 30'. The bottom portions of the stacked type piezoelectric elements 30 and 30' are connected to horizontal blade portions 28b and 28b' of the base members 28 and 28' by hinges 40 and 40' and the elements 30 and 30' between the hinges 40 and 40 and the elements 30 and 30'. With such structure, transmissions of a force and a bending stress accompanied with the expansion and contraction of the stacked type piezoelectric elements 30 and 30' are absorbed by each of the hinges.

Furthermore, through holes 28c and 28c' are penetrated in the horizontal blade portions 28b and 28b' of the base members 28 and 28' of the piezoelectric driving bodies 18 and 20, the holes 28c and 28c' being located on the same axis. The action surfaces 26a and 26a' of the piezoelectric driving bodies 18 and 20 are disposed on the same line. The piezoelectric driving bodies 18 and 20 are integrated with each other by inserting the fitting pin 16 to the through holes 28c and 28c'. Thus the piezoelectric driving bodies 18 and 20 are arranged in parallel with the central axis line of the cylindrical rotation body 12 while the rotational displacement directions of the cylindrical rotation body 12 (action direction of force) are opposite to each other. The action surfaces 26a and 26a' are thrust toward of the axis of the cylindrical rotation body 12 with an elastic force of the leaf springs 22 and 24.

It should be noted that each of the piezoelectric driving bodies 18 and 20 are manufactured in manufacturing processes as a unit and adapted to the apparatus simply reversing one to the other.

A rotation driving function of the piezoelectric rotation driving apparatus 14 will be described below, with reference to FIGS. 4 to 8 which illustrate a principle of operations.

Figure 5:
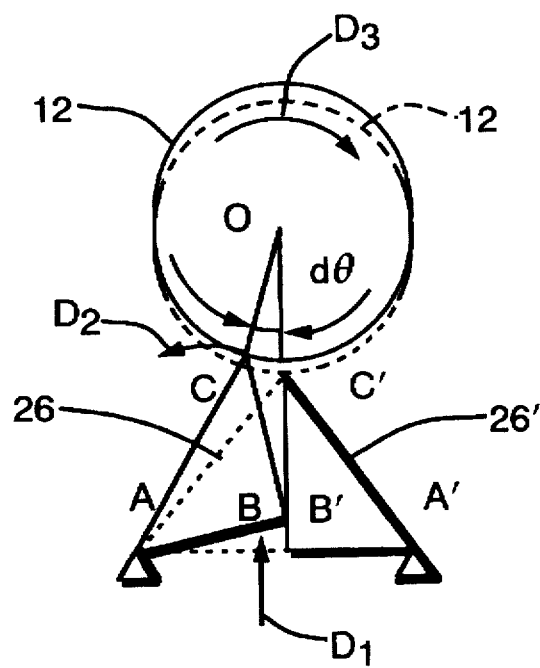
FIG. 5 is a diagram showing an operation principle in a state that one piezoelectric driving body is energized.

First, expanding the stacked type piezoelectric element 30 in one of the piezoelectric driving body 18 by applying a voltage thereto, as shown in FIG. 5, the force produced by the stacked type piezoelectric element 30 acts on the force point B in the arrow line direction $D_1$. As a result, the action member 26 rotations in the direction of arrow line $D_2$ (counterclockwise) around the fulcrum A. At this time, the cylindrical rotation body 12 rotates in the direction of arrow line $D_3$ with a friction force applied from the action point C. Specifically, the reaction surface 26a performs the rotational movement. In the case where the friction force is so large that the slide is not produced between the action point C and the surface of the cylindrical rotation body 12, the rotation body rotates by a small angle denoted with the symbol dθ in FIG. 5. Accompanied with this small angle rotation, the relation distance between the fulcrums A and A' and the center of the cylindrical rotation body 12 becomes larger.

In the figures for explaining the operation principle, the positions of the fulcrums A and A' of the action members 26 and 26' are fixed so that the cylindrical rotation body 12 is elevated. However, in the case where the center O of the rotation body 12 is fixed, the fulcrum A and A' are pushed down.

Figure 6:
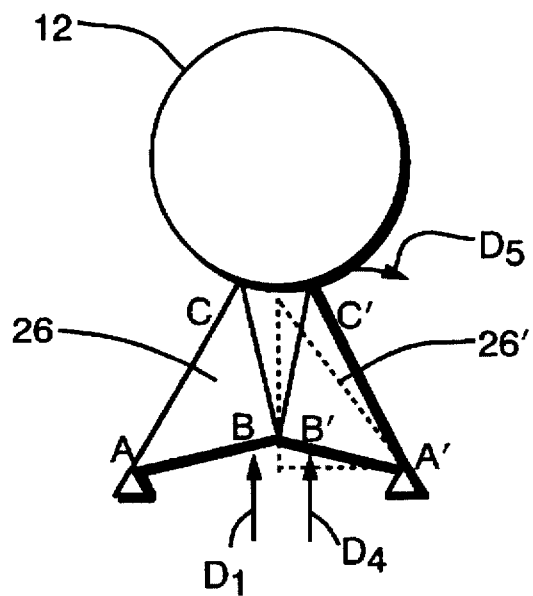
FIG. 6 is a diagram shown an operation principle in a state that the other piezoelectric driving body is energized.

Next, as shown in FIG. 6, maintaining the force in the direction of the arrow $D_1$, a voltage is applied to the stacked type piezoelectric element 30' of other piezoelectric driving body 20 so that the force in the direction of the arrow $D_4$ is applied to the force point B'. As a result, the action member 26' rotates in the direction of the arrow $D_5$ (clockwise) around the fulcrum A'. At this time, as already shown in FIG. 5, since the cylindrical rotation body 12 is in a state where it is elevated, the action point C' moves to the position where it contacts with the outer surface of the cylindrical rotation body 12 without applying the force to the cylindrical rotation body 12. Specifically, at the time when the movements of the action points C and C' are completed, the cylindrical rotation body 12 is in the state where the body 12 is supported by the action points C and C', the body being elevated.

Figure 7:
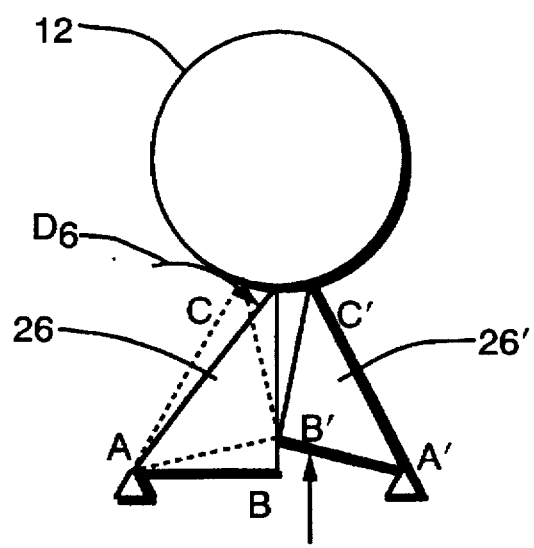
FIG. 7 is a diagram showing an operation principle in a state that the excitation of one piezoelectric driving body is stopped.

Subsequently, as shown in FIG. 7, when the length of the stacked type piezoelectric element 30 returns to the original dimension by stopping to energize the piezoelectric driving body 18, the action member 26 rotates toward the direction of the arrow $D_6$, and returns to the initial state. At this time, since the action member 26' continues to support the cylindrical rotation body 12, the action point C of the action member 26 separates from the outer surface 12a of the cylindrical rotation body 12 returns to the original position without applying the friction force to the cylindrical rotation body 12.

Figure 8:
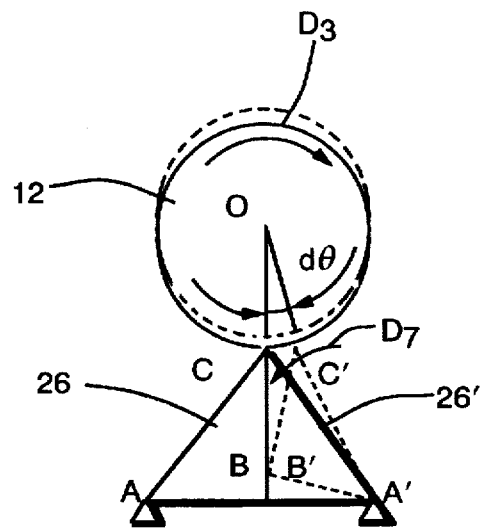
FIG. 8 is a diagram showing an operation principle in a state that the excitation of the other piezoelectric driving body is stopped.

Finally, as shown in FIG. 8, when the length of the stacked type piezoelectric element 30' is returned to the original dimension by stopping energizing of the another piezoelectric driving body 20, the action member 26' rotates in the direction of the arrow $D_7$ so that the action member 26' returns to the initial state. At this time, since the action member 26' returns to the initial state supporting the cylindrical rotation body 12 by the action point C', the friction force is applied to the outer surface of the cylindrical rotation body 12 at the action point C'. As a result, the cylindrical rotation body 12 rotates in the same direction shown by the arrow $D_3$ of FIG. 5. Also in this case, similar to the case of FIG. 5, when the friction force is so large that the slide is not produced between the action point C' and the outer surface 12a of the cylindrical rotation body 12, the cylindrical rotation body 12 rotates by a small angle dθ.

When a load is imposed on the cylindrical rotation body 12 and an insufficient friction force is applied to the load, the slide between the outer surface 12a of the cylindrical rotation body 12 and the action point C' is produced so that the rotation angle of the cylindrical rotation body 12 becomes less than the angle dθ. In any case, during the process where the action member 26' returns, the relative distance between the fulcrums A and A' and the center O of the cylindrical rotation body 12 is reduced to the initial state. Therefore, the rotation of the cylindrical rotation body 12 is certainly produced.

Thereafter, by repeating consecutively the operations shown from FIG. 5 to FIG. 8, the cylindrical rotation body 12 rotates summing up the movement distances by the small rotations in one direction.

Figure 9:
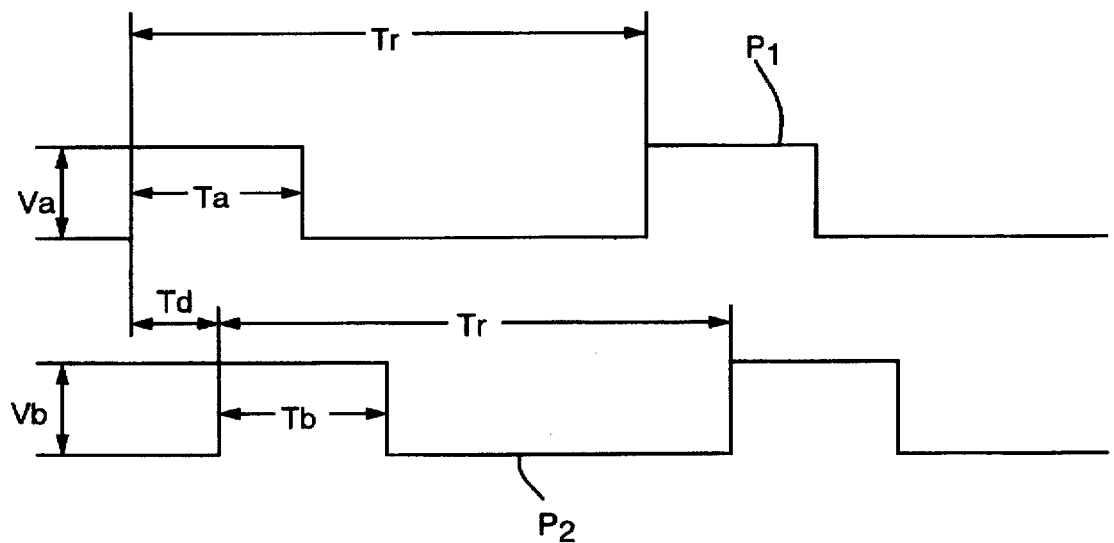
FIG. 9 is a diagram showing voltage applied to a stacked type piezoelectric driving body.

As shown in FIG. 9, the voltage applied to the stacked type piezoelectric incorporated in the set of the piezoelectric driving bodies 18 and 20 in this embodiment are two pulse trains $P_1$ and $P_2$, the phases of the pulse trains $P_1$ and $P_2$ being shifted from each other. The two voltages serve to expand the stacked type piezoelectric elements 30 and 30'. The stacked type piezoelectric elements 30 and 30' produce the forces to expand and contract themselves in proportion to the peaks of the voltage pulses, respectively. Each of the response characteristics of the elements due to the voltage application is different. However, it is possible to make the response characteristics even more precisely by adjusting the peak values Va and Vb of the voltage pulses shown in FIG. 9. Furthermore, the stacked type piezoelectric elements 30 and 30' require the time to respond fully from the application of the voltages. This time, i.e., the response time constant, is obtained as the product of the electric capacitance of the stacked type piezoelectric elements 30 and 30' and the output impedance of the power source for generating the voltage pulses.

In the operation of the piezoelectric rotation driving apparatus according to this embodiment, it is preferable that after one piezoelectric driving body 18 is fully operated, the other piezoelectric driving body 20 is operated. Therefore, the delay time Td of the pulse train $P_2$ compared to the pulse train $P_1$ shown in FIG. 9 should be far longer than the response time constant of the stacked type piezoelectric elements 30 and 30'. In this embodiment, the stacked type piezoelectric elements 30 and 30' are designed such that when the time has passed by half of the period of the voltage application to the stacked type piezoelectric element 30 from the beginning of the voltage application to the element 30, the predetermined voltage is applied to the stacked type piezoelectric element 30'. Furthermore, the widths Ta and Tb of the voltage pulses are set longer than the delay time Td and they are set equal to each other.

Figure 10:
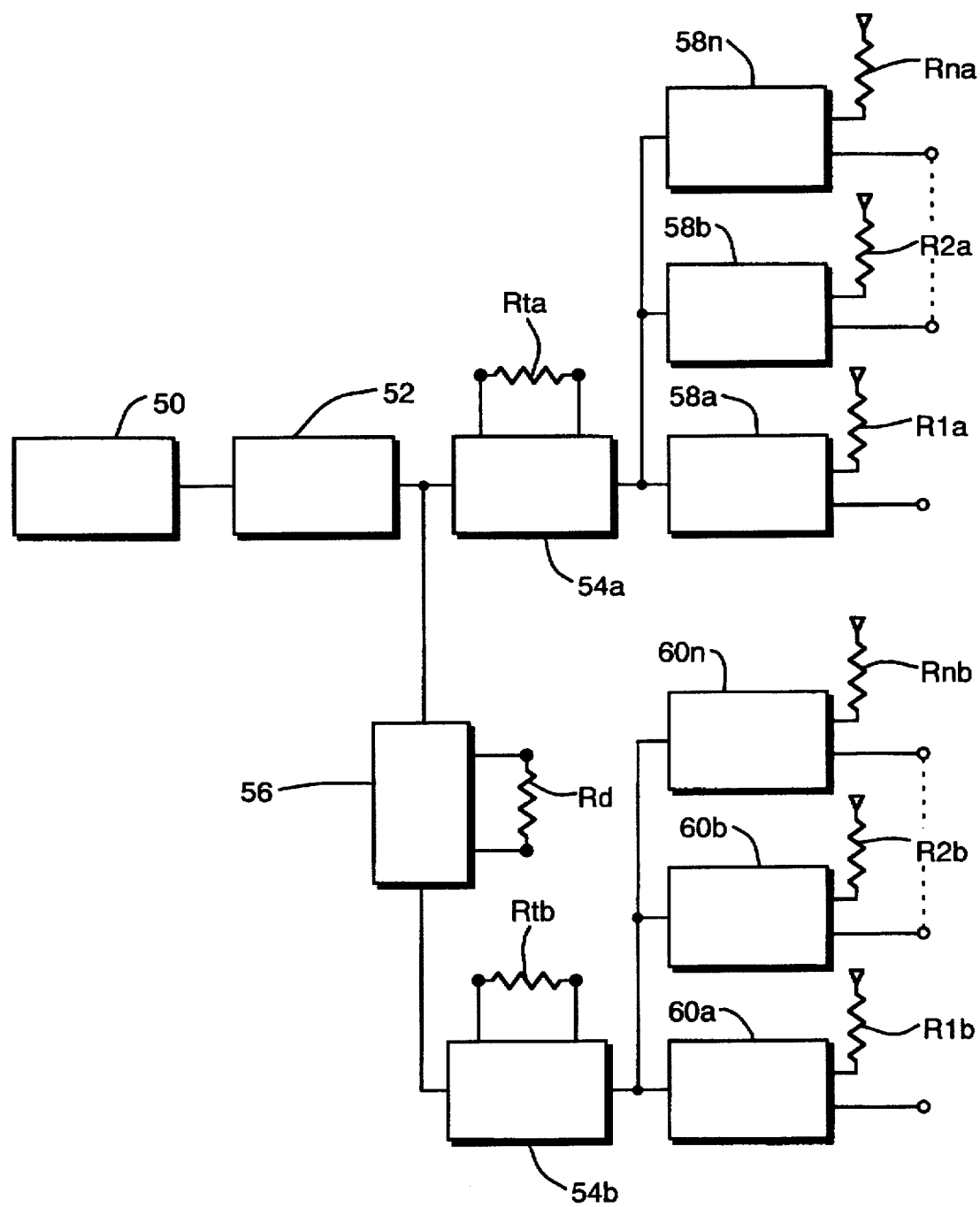
FIG. 10 is a block diagram showing a circuit of a voltage applying means.

The aforementioned voltage pulse trains $P_1$ and $P_2$ can be realized by voltage applying means constituted by using ordinary electric circuit technology. An example of the circuit construction of this voltage applying means is shown in FIG. 10. First, a oscillating voltage having a high recurrency frequency, which is provided from an oscillating circuit 50, is converted to a oscillating voltage having a predetermined frequency by a frequency dividing circuit 52. Pulse shaping circuit 54a uses a voltage variation as a trigger, which is a rise-up or a decay of the output voltage from the frequency dividing circuit 52, and produces voltage pulses having a predetermined time width. A monostable multivibrator may be used as the pulse shaping circuit 54a. The time width of the voltage pulses is determined by adjusting an external resistor Rta which constitutes a time constant circuit.

On the other hand, a delay circuit 56 delays the output voltage from the frequency dividing circuit 52. A pulse shaping circuit 54b uses the voltage variation delayed by the delay circuit 56 as a trigger, which is a rise-up or a decay of the output voltage. The pulse shaping circuit 54b produces voltage pulses having a predetermined time width. The delay time of the delay circuit 56 is determined by adjusting an external resistor Rd which constitutes a time constant circuit. The time width of the voltage pulses produced from the pulse shaping circuit 54b is determined by adjusting an external resistor Rtb which constitutes a time constant circuit.

Output pulses from the pulse shaping circuits 54a and 54b are applied to respective driving circuits 58a, 58b, ..., 58n and 60a, 60b, ... 60n and processed to produce the voltage pulses having a predetermined peak value. Therafter, the voltage pulses are applied to the stacked type piezoelectric elements 30 and 30' via output impedances.

A structure and a typical operation of the piezoelectric rotation driving apparatus 14 according to the foregoing embodiment of the present invention will be described below.

In the piezoelectric rotation driving apparatus 14, the cylindrical rotation body 12 has a diameter of 20 mm, and the relations between the fulcrums A and A', the force points B and B', and the action points C ad C' in the action member 26 and 26' of the piezoelectric driving body 18 and 20 are $<ABC=<A'B'C'=90°$, $AB=A'B'=7$ mm, and $BC=B'C'=12.5$ mm. AE0203D08 manufactured by Nihon Electric Co. Ltd. was used as the stacked type piezoelectric 30 and 30'. The piezoelectric driving bodies 18 and 20 were pressed against the outer surface 12a of the cylindrical rotation body 12 by the leaf springs 22 and 24 with force of 10 kgf and voltage pulses of peak value 50V, width 500 μm, and recurrency frequency 1 kHz were applied to the stacked type piezoelectric element 30. At this time, the response time of the stacked type piezoelectric element 30 was about 150 μsec. When applying one voltage pulse train $P_1$ to the stacked type piezoelectric element 30, the element 30 expanded by about 4.5 μm. As a result, as shown with the arrow $D_2$ of FIG. 5, the action point C moved upward by about 4.5 μm, and moved toward the left direction by about 8 μm. The cylindrical rotation body 12 rotated by about 8 μm that is the distance at the surface of the rotation body 12.

Next, the other voltage pulse train $P_2$ delayed by 250 μsec as compared with the aforementioned voltage pulse train $P_1$ was applied to the stacked type piezoelectric element 30'. When applying the voltage pulse train $P_2$, the stacked type piezoelectric element 30' expanded by 4.5 μm. As a result, as shown with the arrow $D_5$, of FIG. 6, the action point C' moved upward by about 4.5 μm, and moved toward the right direction about 8 μm.

As shown with the arrow $D_7$ of FIG. 8, even at the time when the application of the voltage pulse train $P_2$ to the stacked type piezoelectric element 30' was finished, the cylindrical rotation body 12 rotated by about 8 μm that is the distance at the surface of the rotation body 12. By application of voltage pulse train having recurrency frequency 1 kHz, the cylindrical rotation body 12 began to continue the rotation virtually at the speed of rotation of 15 r.p.m. At that time, the output torque was as high as about 2 kgf·cm, not depending on the rotation speed. The aforementioned speed of the rotation is in inverse proportion to the diameter of the cylindrical rotation body 12, and in proportion to the recurrency frequency of the voltage pulses. The aforementioned rotation speed is in proportion to the ratio of the length BC/AB (=B'C'/A'B'), as long as $<ABC (=<A'B'C')=90°$ is satisfied, which is the relation between the fulcrum, the force point, and the action point.

However, it is difficult to change the diameter of the cylindrical rotation body 12 and the relative positions between the fulcrum, the force point, and the action point to a great degree. Furthermore, since the upper limit of the operation frequency at which the stacked type piezoelectric element 30 and 30' can function is 1.5 kHz, there is a limitation to increasing the rotation speed. Therefore, it is difficult to obtain the high speed rotation by the piezoelectric rotation driving apparatus 14 of the present invention, as is obtained by the electromagnetic motors. However, in the foregoing operation example, one rotation operation is composed of about 7800 steps, and the piezoelectric rotation driving apparatus 14 possesses much higher resolution power than the electromagnetic motors. Specifically, the piezoelectric rotation driving apparatus 14 of this embodiment of the present invention has the definite feature that it is able to perform a small angle control with a high torque.

Figure 11:
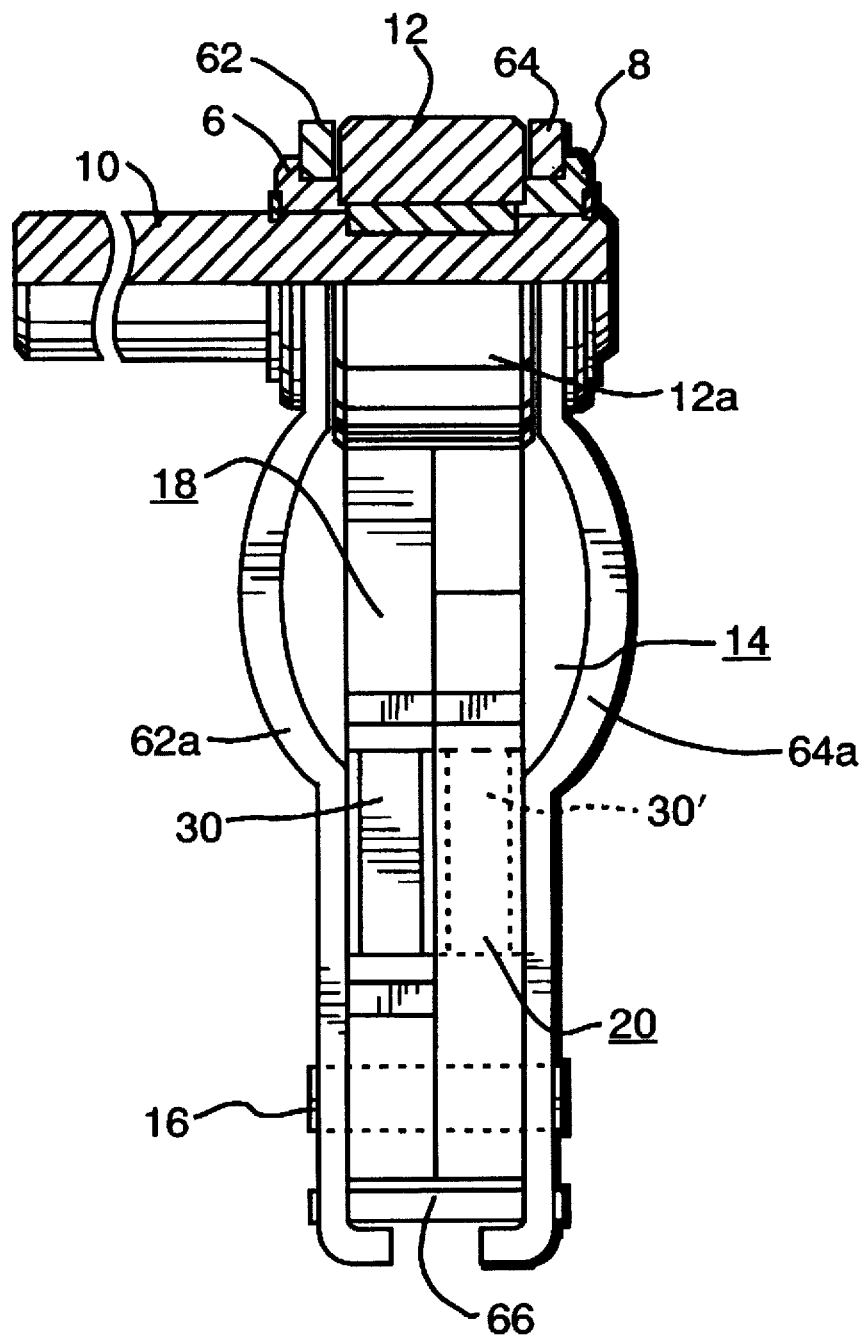
FIG. 11 is a front view showing a partially sectional illustration of a second embodiment of the present invention.
Figure 12:
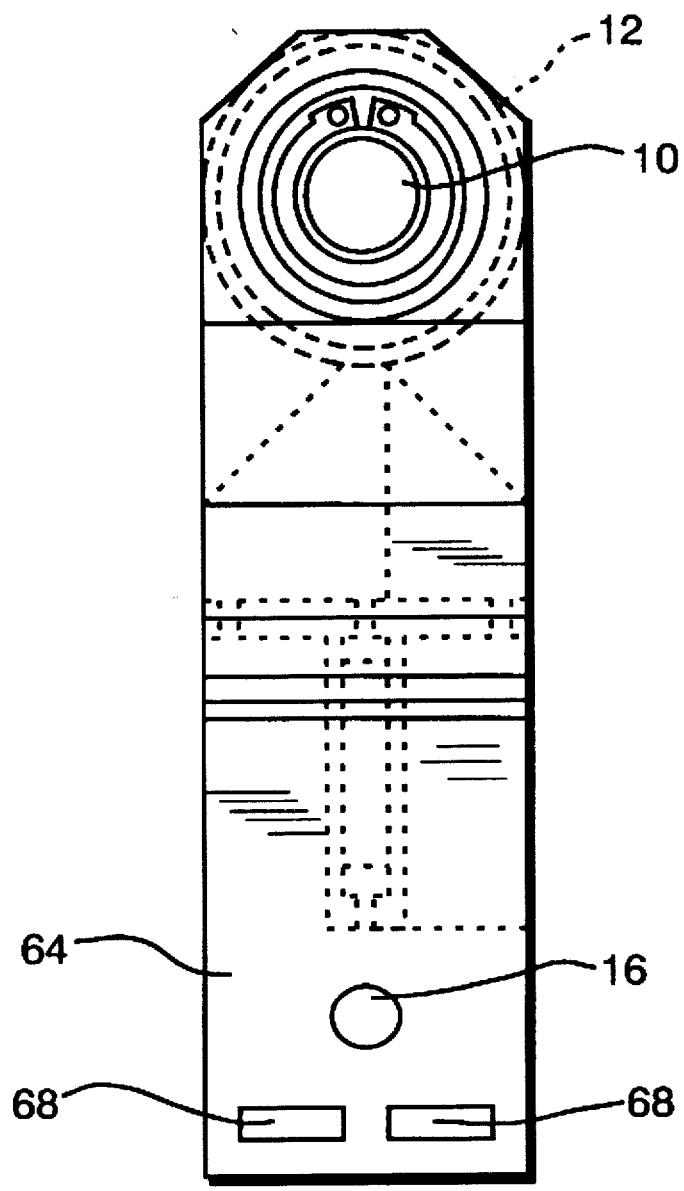
FIG. 12 is a side view of FIG. 11.

Next, FIGS. 11 and 12 (side view of FIG. 11) illustrate a piezoelectric rotation driving apparatus of a second embodiment of the present invention, wherein the leaf springs 22 and 24 of the elastic member in the first foregoing embodiment are altered.

Specifically, as shown in FIGS. 11 and 12, the piezoelectric rotation driving apparatus 14 has such structure that a set of piezoelectric driving bodies 18 and 20 are held with side plates 62 and 64 including bending portions 62a and 64a, and action surfaces 26a and 26a' are pressed against an outer surface 12a of a cylindrical rotation body 12 with the forces produced by the bending portions 62a and 64a. Reference numerals 66 and 68 each denote a supporting plate. It should be noted that various kinds of spring members such as coil springs and the like may be employed as an elastic member for producing a pressing force.

Figure 13:
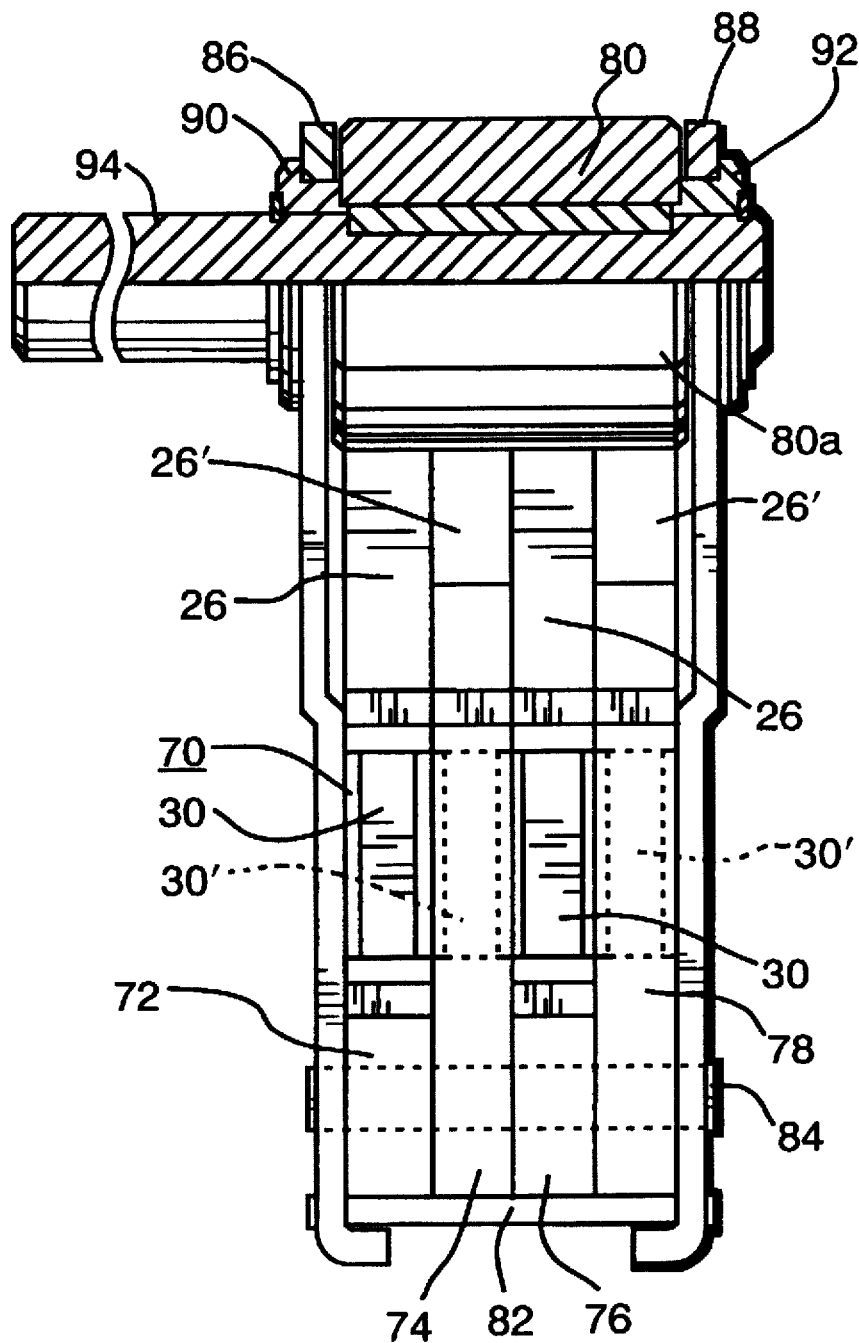
FIG. 13 is a front view showing a partially sectional illustration of a third embodiment of the present invention.

Next, FIG. 13 illustrates a piezoelectric rotating driving apparatus of a third embodiment of the present invention, wherein in order to increase output torque, plural sets of piezoelectric driving bodies incorporated in the apparatus are disposed along the center axis of a rotor.

As shown in FIG. 13, the piezoelectric rotation driving apparatus 70 is composed of piezoelectric driving bodies 72, 74, 76, and 78 having the same construction as those of the foregoing embodiments, a leaf spring 82 pressing these piezoelectric driving bodies 72, 74, 76, and 78 against an outer surface of a cylindrical rotation body 80, and a fitting pin 84 serving as an integrating member. Reference numerals 86 and 88 each denote a side plate; each of 90 and 92, a bearing; and 94, a rotating shaft.

The piezoelectric rotation driving apparatus 70 of the third embodiment of the present invention uses first and second sets of the piezoelectric driving bodies 72, 74, 76, and 78. The first set is composed of the piezoelectric driving bodies 72 and 74, and the second set is composed of the piezoelectric driving bodies 76 and 78. The first set produces a force acting in one direction and the second set produces a force acting in an opposite direction to that produced by the first set. Specifically, in the first and second sets, the piezoelectric driving bodies are arranged such that the piezoelectric driving bodies in the same set produce a force acting in the same direction and the piezoelectric driving bodies in different set produce a force acting in an opposite direction. With such structure, by driving the plurality of the piezoelectric driving bodies simultaneously, high output torque can be obtained. The piezoelectric driving bodies producing the force acting in the same direction are driven simultaneously. According to the operation principle similar to the principle similar to the foregoing first embodiment, a rotation output can be obtained.

In this embodiment, four piezoelectric driving bodies are used. However, the number of the piezoelectric driving bodies may be increased. The driving power is increased in proportion to the number of the piezoelectric driving bodies simultaneously driven, and the output torque increases in proportion to the driving power. The number of the piezoelectric driving bodies should be preferably the same in each of the sets. Because in the case where the number of the piezoelectric driving bodies is different among the sets, the maximum load is determined according to the driving force of the set having less piezoelectric driving bodies, so that the driving power of the set having more piezoelectric driving bodies cannot be effectively utilized.

Figure 14:
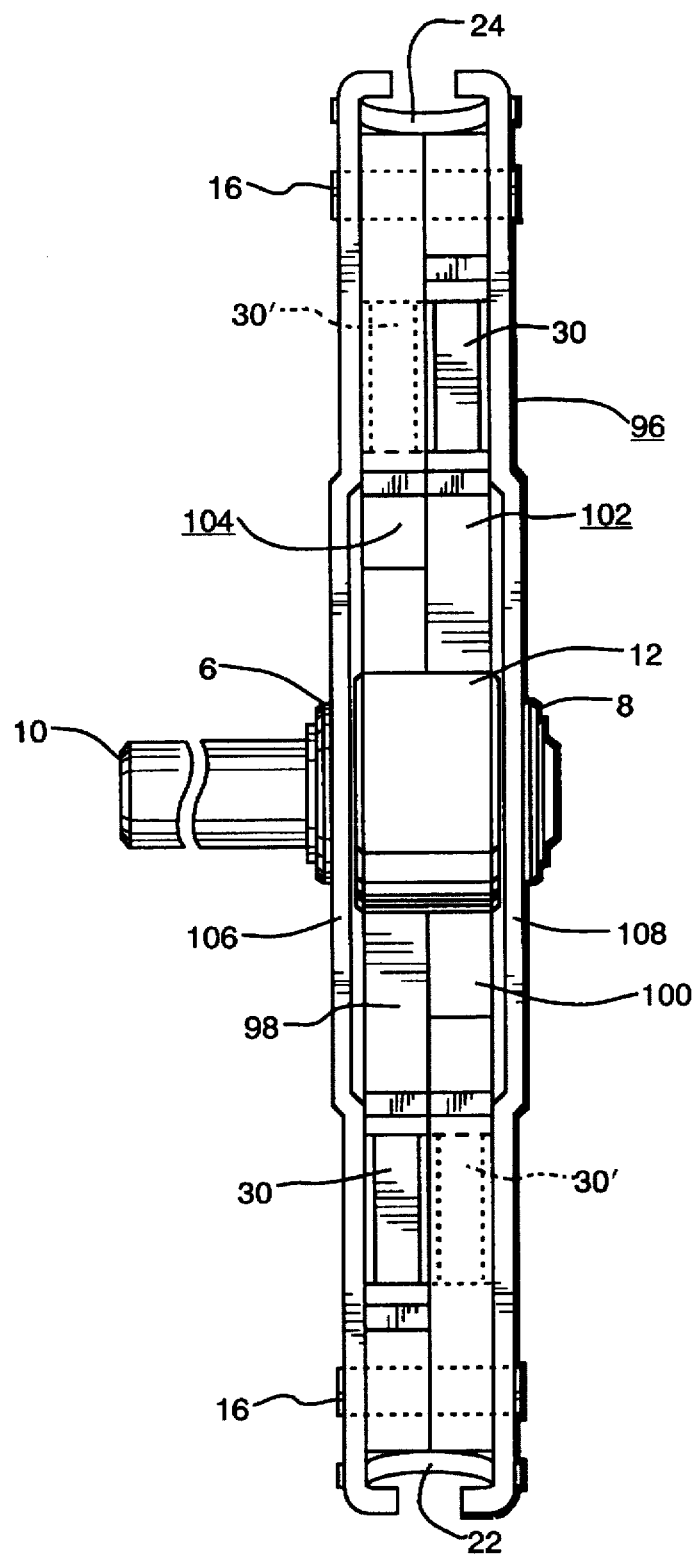
FIG. 14 is a front view showing a fourth embodiment of the present invention.

FIG. 14 illustrates a fourth embodiment of a piezoelectric rotation driving apparatus of the present invention, wherein plural sets of piezoelectric driving bodies are arranged around a rotor.

A piezoelectric rotation driving apparatus 96 in the fourth embodiment is composed of a set of piezoelectric driving bodies 98 and 100 pressed by a leaf spring 22 against a cylindrical rotation body 12, and a set of piezoelectric driving bodies 102 and 104 arranged around the cylindrical rotation body 12, the bodies 102 and 104 being in the opposite position to the piezoelectric driving bodies 98 and 100 in a direction of a diameter of the cylindrical rotation body 12. The piezoelectric driving bodies 102 and 104 are pressed by a leaf spring 24 against the cylindrical rotation body 12. The structure of each of the piezoelectric driving bodies is the same as that of the piezoelectric driving bodies in the foregoing embodiments. Reference numerals 106 and 108 each denote a side plate.

The piezoelectric driving bodies 98 and 100 produce forces acting in the same direction along the circumference of the circle of the cylindrical rotation body 12, and are driven at the same timing. The piezoelectric driving bodies 100 and 104 also produce forces and are driven, in the same manner as in the piezoelectric driving bodies 98 and 100. The rotation output can be obtained according to a similar operation principle to the foregoing embodiments.

In the embodiment described above, the examples where the action point of the action member in any piezoelectric driving body is pressed against the outer surface of the cylindrical rotation body are shown. However, the rotation driving function will be realized in a construction where the aforementioned action point is pressed against a side plane of the cylindrical rotation body.

Figure 15:
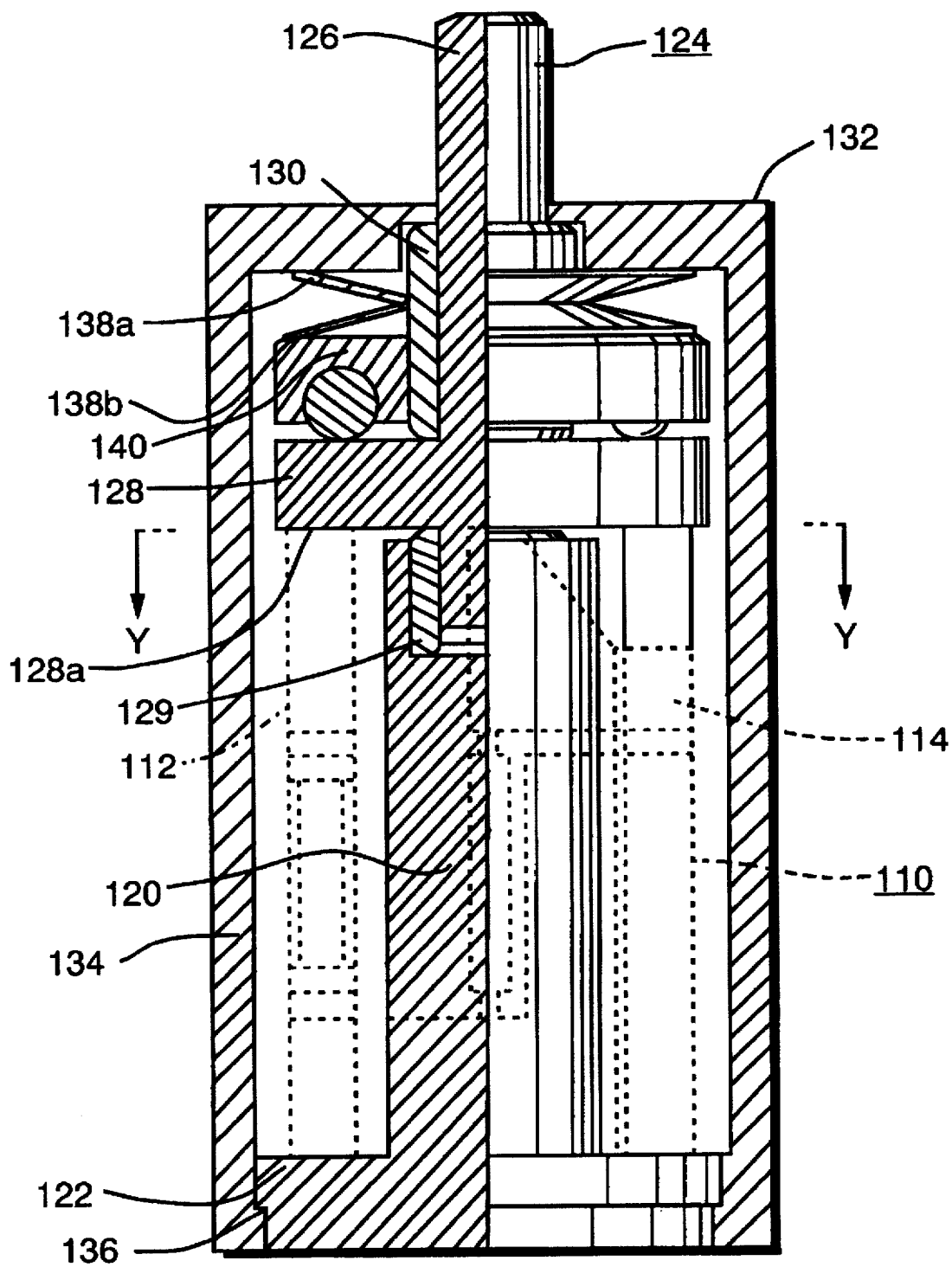
FIG. 15 is a sectional view schematically showing a fifth embodiment.
Figure 16:
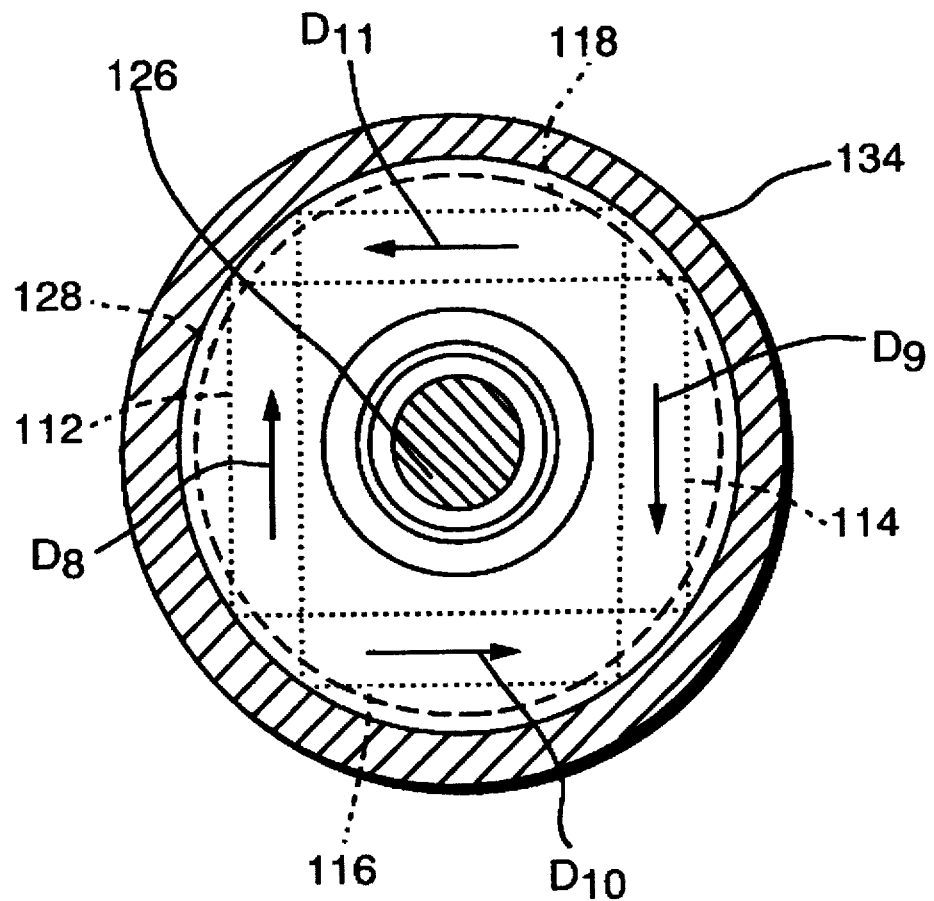
FIG. 16 is a sectional view taken along the line Y—Y in FIG. 15.

An embodiment in this case (fifth embodiment) will be shown in FIGS. 15 and 16.

In the fifth embodiment, units of four piezoelectric driving bodies similar in the foregoing embodiments are used. In FIGS. 15 and 16 (sectional view taken along the line Y—Y of FIG. 15), these piezoelectric driving bodies 112, 114, 116, and 118 are illustrated with the dotted lines, for convenience of the understanding of the structure of the piezoelectric rotation driving apparatus 110 of the embodiment of the present invention.

The piezoelectric rotation driving apparatus 110 is composed of piezoelectric driving bodies 112, 114, 116, and 118, and belleville springs 138a and 138b serving as an elastic member for pressing the piezoelectric driving bodies 112, 124, 116, and 118 against a flange portion 128 of a rotation shaft 126 serving as a rotor.

Each of the piezoelectric driving bodies 112, 114, 116, and 118 is arranged on a disk-shaped seat member 122 integrated with a central bearing 120 at the positions symmetrical to the center axis of the bearing 120. The rotor 124 is formed of the rotation shaft 126 and a flange portion 128 extending from the rotation shaft 126 approximately perpendicular thereto, the rotation shaft 126 and the flange portion 128 being integrated with each other. The one end of the rotation shaft 126 is supported by the central bearing 120 via a bush 129, and the other end is supported by a housing bearing 132 via bush 130.

Action points in the action members of the four piezoelectric driving bodies 112, 124, 116, and 118 contact with a side plane 128 of the flange portion 128. A nail portion of a housing member 134 is fastened to the seat member 122. At this situation, two belleville springs 138a and 138b inserted between the housing bearing 132 and the flange portion 128 are changed to a crushed state by a predetermined dimension. The crushed belleville springs 138a and 138b produce a pressurizing force acting between the side plane 128a of the flange portion 128 and the piezoelectric driving bodies 112, 114, 116, and 118 via a bearing 140.

Though the flange portion 128 is pressurized, the rotation is not obstructed by virtue of the bearing 140. In this embodiment, as is shown the arrangement relation in FIG. 16, two piezoelectric driving bodies 112 and 114 are arranged such that the action directions of the action points thereof are in the directions illustrated by the arrow $D_8$ and $D_9$ (clockwise). The other piezoelectric driving bodies 116 and 118 are arranged such that the action directions of the action points thereof are in the directions illustrated by the arrow $D_{10}$ and $D_{11}$ (counterclockwise). Also in this embodiment, in the similar manner to the above described embodiments, by driving simultaneously the piezoelectric driving bodies wherein the action directions of the action points are in the same direction, it is possible to rotate the flange portion 128, that is, the rotation shaft 126.

Furthermore, similar to the foregoing embodiments, also in this embodiment, at least two piezoelectric driving bodies are necessary and the same number of the piezoelectric bodies of the different action directions should be used.

In this embodiment, when the two piezoelectric driving bodies are used, in order that the rotation shaft 126 is disposed without an eccentricity and is allowed to move slightly toward the axis direction during the operation, the housing bearing 132, the central bearing 120, and the rotation shaft 126 should be worked precisely so that the relative positional relations thereof to the bushes 129 and 130 are not broken down.

When more than two piezoelectric driving bodies are used, as shown in FIG. 16, by disposing two groups of two piezoelectric driving bodies symmetrically to the axis of the rotor, wherein the action directions of the piezoelectric driving bodies in the same group are the same, the eccentricity of the rotation shaft 126 during the operation can be prevented. Also in this embodiment, similar to the foregoing embodiment, in the process for converting the force produced by the stacked type piezoelectric element to the rotation force through the friction force, little loss of rotation power can be realized with a high efficiency and a stability.

In the foregoing embodiments, the shapes and the arrangements of each of the components constituting the piezoelectric rotation driving apparatus of the present invention are specified. However, the present invention is not limited to the above shapes and the arrangements. It should be understood that the piezoelectric driving apparatus of the present invention can be modified appropriately in a scope satisfying the stable and high torque function without the foregoing inertia rotation period.

As described above, according to the present invention, since the excitation energy of the piezoelectric element can be transferred to the rotation of the rotor with high efficiency, and without the inertia rotation period where the rotor is thrust up by the piezoelectric driving body and separates therefrom. Therefore, a torque with a high efficiency and a stability can be obtained.

Furthermore, since the piezoelectric rotation driving apparatus of the present invention employs a lever principle losing less power, construction is simple and the number of the piezoelectric elements is small. Therefore, miniaturization of size of the apparatus and high torque of the apparatus can be realized.

Although the preferred embodiments of the present invention have been described in detail, it should be understood that various changes, substitutions and alternations can be made therein without departing from spirit and scope of the present invention as defined by the appended claims.

What is claimed is:

1. A piezoelectric rotation driving apparatus comprising at least one set of piezoelectric driving bodies, each of said piezoelectric driving bodies including: an action member having an action surface contacting with a rotor, a base member connected to said action member at a fulcrum portion thereof by a first hinge, said fulcrum portion enabling said action member to move rotatively, a piezoelectric element, one end of which is connected to said action member by a second hinge, and the other end of which is connected to said base member by a third hinge, said piezoelectric element expanding by being applied with a voltage and driving said action member thereby moving said action surface rotatively; wherein said at least one set of the piezoelectric driving bodies is adapted integrally in the apparatus such that action surfaces of the piezoelectric driving bodies of the at least one set of driving bodies are disposed on the same line and in parallel to a central axis of said rotor and respective rotational displacement directions of said action surfaces are opposite to each other, and said action surfaces are thrust toward the central axis of said rotor by an elastic force of an elastic member.

2. The piezoelectric rotation driving apparatus as claimed in claim 1, wherein applications of voltages to piezoelectric elements of said at least one set of the piezoelectric driving bodies is performed at a timing wherein application of voltage to one piezoelectric element is begun in accordance with rotation direction of the rotor, and application of voltage to the other piezoelectric element is begun when half of a voltage application period of one piezoelectric driving body has passed.

3. The piezoelectric rotation driving apparatus as claimed in claim 1, wherein plural sets of piezoelectric driving bodies integrated with each other are disposed along the central axis of the rotor.

4. The piezoelectric rotation driving apparatus as claimed in claim 1, wherein plural sets of piezoelectric driving bodies integrated with each other are disposed around the rotor.

5. A piezoelectric rotation driving apparatus comprising:

at least one set of piezoelectric driving bodies;

wherein each of said piezoelectric driving bodies includes: an action member having an action surface contacting with a rotor a base member connected to said action member at a fulcrum portion thereof by a first hinge, said fulcrum portion enabling said action member to move rotatively, a piezoelectric element, one end of which is connected to said action member by a second hinge, and the other end of which is connected to said base member by a third hinge, said element expanding by being applied with a voltage and driving said action member thereby moving said action surface rotatively;

and wherein said rotor includes a rotating shaft and a flange portion extending from said rotation shaft perpendicular to said rotation shaft; the piezoelectric driving bodies are arranged around said rotation shaft and along an axis line thereof; action surfaces of each of said piezoelectric driving bodies are disposed on a side surface of said flange at intervals; and said action surfaces of each of said piezoelectric driving bodies are pressed against the side surface of said flange portion by an elastic force of an elastic member.

* * * * *

UNITED STATES PATENT AND TRADEMARK OFFICE
CERTIFICATE OF CORRECTION

PATENT NO. : 5,712,524
DATED : January 27, 1998
INVENTOR(S) : Michihisa Suga

It is certified that error appears in the above-indentified patent and that said Letters Patent is hereby corrected as shown below:

Claim 5, Col. 16, line 37, please insert --portion-- after "flange".

Signed and Sealed this

Twenty-second Day of September, 1998

Attest:

BRUCE LEHMAN

*Attesting Officer*  *Commissioner of Patents and Trademarks*